United States Patent
Green et al.

(10) Patent No.: US 8,592,743 B2
(45) Date of Patent: *Nov. 26, 2013

(54) LOW DISTORTION HIGH BANDWIDTH ADAPTIVE TRANSMISSION LINE FOR INTEGRATED PHOTONIC APPLICATIONS

(75) Inventors: William M. Green, Astoria, NY (US); Alexander V. Rylyakov, Mount Kisco, NY (US); Clint S. Schow, Ossing, NY (US); Yurii A. Vlasov, Katonah, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/599,056

(22) Filed: Aug. 30, 2012

(65) Prior Publication Data

US 2012/0319805 A1    Dec. 20, 2012

Related U.S. Application Data

(63) Continuation of application No. 12/795,893, filed on Jun. 8, 2010.

(51) Int. Cl.
*H03L 7/00*    (2006.01)
(52) U.S. Cl.
USPC ............ 250/216; 250/227.12; 385/2; 385/8; 333/32; 333/156; 359/237
(58) Field of Classification Search
USPC ............ 250/216, 227.11, 227.12, 227.24, 250/227.28; 385/1, 2, 3, 8, 14, 39, 237; 333/32, 33, 156, 157
See application file for complete search history.

(56) References Cited

U.S. PATENT DOCUMENTS

| | | | |
|---|---|---|---|
| 4,152,679 A | 5/1979 | Chen | |
| 5,611,008 A | 3/1997 | Yap | |
| 6,114,938 A | 9/2000 | Iida et al. | |
| 6,320,249 B1 | 11/2001 | Yoon | |
| 6,380,608 B1 | 4/2002 | Bentley | |
| 6,980,063 B2 | 12/2005 | Mikalauskas | |
| 7,039,258 B2 | 5/2006 | Gunn, III et al. | |
| 7,515,775 B1 | 4/2009 | Kucharski et al. | |
| 7,626,216 B2 | 12/2009 | McKinzie, III | |
| 2003/0235359 A1 | 12/2003 | Geary et al. | |
| 2004/0104785 A1 | 6/2004 | Park et al. | |
| 2007/0230854 A1* | 10/2007 | Keil | 385/1 |
| 2007/0280576 A1* | 12/2007 | Kucharski et al. | 385/1 |

(Continued)

OTHER PUBLICATIONS

Analui, B., et al. "A Fully Integrated 20-GB/S Optoelectronic Transceiver Implemented in a Standard 0.13-UM CMOS SOI Technology" IEEE Journal of Solid-State Circuits. vol. 41, No. 12. Dec. 2006. pp. 2945-2955.

(Continued)

*Primary Examiner* — Kevin Pyo
(74) *Attorney, Agent, or Firm* — Tutunjian & Bitetto, P.C.; Anne V. Dougherty (57) ABSTRACT

A transmission line and method for implementing includes a plurality of segments forming an electrical path and a continuous optical path passing through the segments. Discrete inductors are formed between and connect adjacent segments. The inductors are formed in a plurality of metal layers of an integrated circuit to balance capacitance of an optical modulator which includes the transmission line to achieve a characteristic impedance for the transmission line.

18 Claims, 6 Drawing Sheets

(56) References Cited

U.S. PATENT DOCUMENTS

| | | |
|---|---|---|
| 2007/0292073 A1 | 12/2007 | Li |
| 2008/0048799 A1 | 2/2008 | Wang et al. |
| 2009/0262912 A1 | 10/2009 | Bremer et al. |
| 2009/0297088 A1 | 12/2009 | Koh |

OTHER PUBLICATIONS

Krishnamoorthy, A., et al. "Optoelectronic-VLSI: Photonics Integrated With VLSI Circuits" IEEE Journal of Selected Topics in Quantum Electronics. vol. 4, No. 6. Nov./Dec. 1998. pp. 899-912.

Liao, L., et al. "High Speed Silicon Mach-Zehnder Modulator" Optics Express. vol. 13, No. 8. Apr. 2005. pp. 3129-3135.

Burghartz, J., et al. "Microwave Inductors and Capacitors in Standard Multilevel Interconnect Silicon Technology" IEEE Transactions on Microwave Theory and Techniques, vol. 44, No. 1. Jan. 1996. pp. 100-104.

WIPO—Patent Cooperation Treaty. International Search Report and Written Opinion for corresponding International Application No. PCT/EP2011/058472. Issued: Aug. 5, 2011. (14 Pages).

* cited by examiner

LOW DISTORTION HIGH BANDWIDTH ADAPTIVE TRANSMISSION LINE FOR INTEGRATED PHOTONIC APPLICATIONS

RELATED APPLICATION INFORMATION

This application is a Continuation application of co-pending U.S. patent application Ser. No. 12/795,893 filed on Jun. 8, 2010, incorporated herein by reference in its entirety.

BACKGROUND

1. Technical Field

The present invention relates to transmission lines and more particularly to systems and methods for adaptive transmission lines that provide low distortion without sacrificing high transmission rates.

2. Description of the Related Art

Very high-speed optical modulators (e.g., greater than 20 Gb/s) are usually implemented as traveling wave (TW) structures. The TW configuration attempts to distribute capacitance of a long modulator such that it presents a reasonable characteristic impedance to a driver circuit instead of a large lumped capacitance. The TW configuration attempts to match the velocity of a microwave modulation signal traveling along an electrode with an optical wave being modulated which is also moving along the electrode.

An ideal, lossless transmission line is designed to have a characteristic impedance ($Z_{0U}$) and microwave velocity ($v_{pU}$) that are both higher than final loaded design targets ($Z_{0L}$, $v_{pL}$) when the transmission line is unloaded. In this context, unloaded means that the transmission line is not in contact with the waveguide that includes the optical signal. The ideal, lossless transmission line equations for an unloaded condition include:

$$Z_{0U} = \sqrt{\frac{L}{C_U}}, \quad v_{pU} = \frac{1}{\sqrt{LC_U}}, \quad n_{pU} = \frac{c}{v_p} = c\sqrt{LC_U}$$

The ideal, lossless transmission line equations for a loaded condition include:

$$Z_{0L} = \sqrt{\frac{L}{C_U + C_L}}, \quad v_{pL} = \frac{1}{\sqrt{L(C_U + C_L)}}, \quad n_{pL} = \frac{c}{v_p} = c\sqrt{L(C_U + C_L)}$$

where Z is the impedance, v is the velocity, L is the inductance, C is the capacitance, c is the speed of light and n is an index of refraction.

A loading factor is a ratio of a total length of the loading contact elements to a total modulator length. Each of the active loading elements adds capacitance, which lowers a characteristic impedance and microwave velocity. It is difficult to maximize the impedance and velocity of the unloaded transmission lines. Active optical waveguides in typical semiconductor optical modulators have a high capacitance per unit length. Low unloaded characteristic impedance and velocity combined with highly capacitive loading elements translates into very low loading factors (10-50%). This makes it difficult to achieve a final, loaded characteristic impedance of the TW modulator that is close to 50-ohms while providing a reasonable velocity match to the optical signal. A low loading factor means that the modulator is not space efficient, i.e., most of the modulator physical length does not contribute to the optical modulation.

Furthermore, passive portions of the modulator that do not contribute to modulation add optical loss. Further, a microwave modulation signal incurs extra ohmic losses when it has to travel along longer electrodes. A standard problem with lossy transmission lines is that the impedance of the line is a function of frequency, and this results in distortion.

SUMMARY

A transmission line and method for implementing includes a plurality of segments forming an electrical path and a continuous optical path passing through the segments. Discrete inductors are formed between and connect adjacent segments. The inductors are formed in a plurality of metal layers of an integrated circuit to balance capacitance of an optical modulator which includes the transmission line to achieve a characteristic impedance for the transmission line.

Another transmission line includes a plurality of segments having a continuous electrical path and a continuous optical path through the segments. Discrete inductors are formed between and connect adjacent segments. The inductors are formed in a plurality of metal layers of an integrated circuit to balance capacitance of an optical modulator which includes the transmission line to achieve a characteristic impedance for the transmission line. A delay mechanism is configured to match phase between an electrical signal traveling on the electrical path and an optical signal traveling on the optical path to enable an operating bandwidth.

A method for implementing a broadband transmission line includes balancing capacitance of an optical modulator of a broadband transmission line to achieve a characteristic impedance for the transmission line by connecting a discrete inductor between adjacent segments of the transmission line; and tuning a control circuit to match velocity between an electrical signal and an optical signal traveling in the transmission line.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with the present principles, an optimized traveling wave (TW) structure and control circuit for semiconductor optical modulators is provided. In a particularly useful embodiment, photonic modulators are fabricated in an integrated circuit process (e.g., a complementary metal oxide semiconductor (CMOS) process) with multiple metal layers. Aspects of the present systems and methods include: distributed electrodes utilizing multi-metal layer inductors to balance optical modulator capacitance to achieve a desired characteristic impedance; low-loss optical delay lines inserted between active modulator segments to slow down the optical wave being modulated and match its velocity to the electrical modulating signal; and a tunable control circuit and method for implementing the tunable control circuit for velocity matching the electrical modulation signal and optical signal traveling in a transmission line (e.g., of an optical modulator).

Aspects of the present invention are described below with reference to flowchart illustrations and/or block diagrams of methods, an apparatus (systems) according to embodiments of the invention. The flowchart and block diagrams in the Figures illustrate the architecture, functionality, and operation of possible implementations of systems, devices and methods according to various embodiments of the present invention. In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and/or computer instructions.

It is to be understood that the present invention will be described in terms of a given illustrative architecture using silicon technology; however, other architectures, structures, substrate materials (e.g., InP, GaAs, polymers, etc.) and process features and steps may be varied within the scope of the present invention.

Circuits as described herein may be part of a design for an integrated circuit chip or employ an integrated circuit chip or chips. The chip design may be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer may transmit the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The method as described herein may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Figure 1:
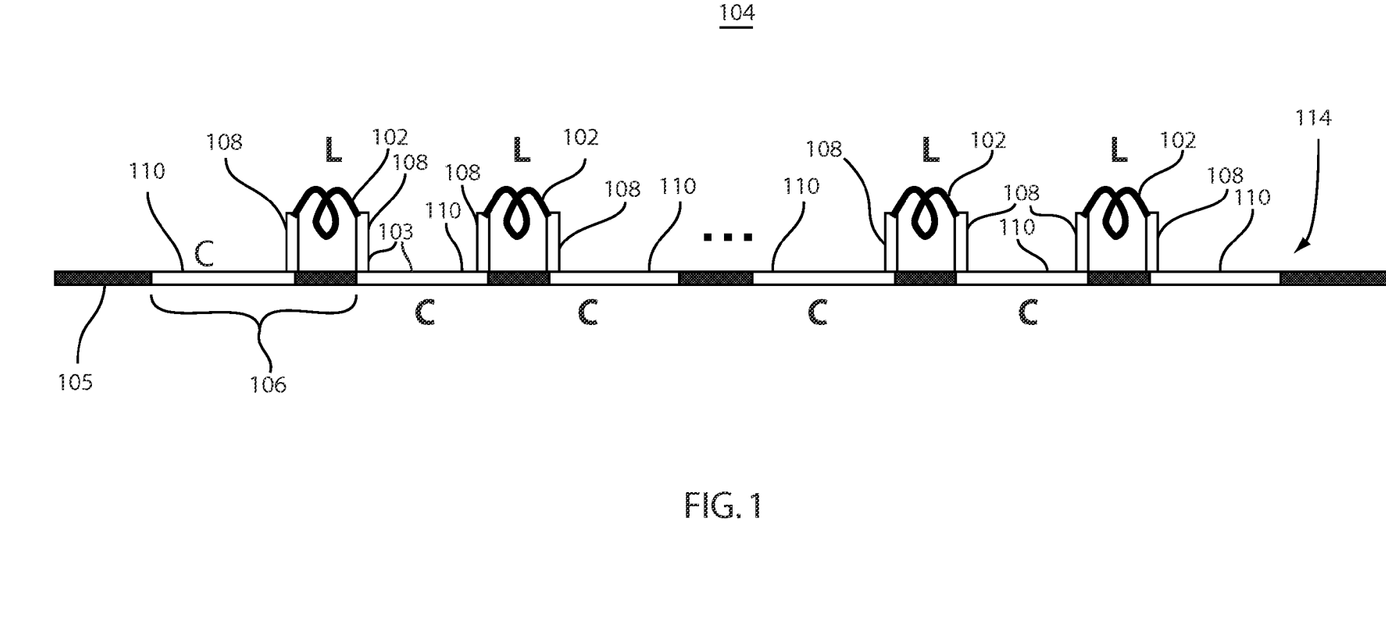
FIG. 1 is a diagram showing a transmission line having discrete inductors between segments in accordance with one illustrative embodiment.

Referring now to the drawings in which like numerals represent the same or similar elements and initially to FIG. 1, a diagram shows discrete low-resistance (R), high-inductive (L) coils 102 inserted into a transmission line 104 in accordance with one embodiment. A transmission line 104 is designed to have a characteristic impedance ($Z_{0U}$) and microwave velocity ($v_{pU}$) that are both higher than final loaded design targets ($Z_{0L}$, $v_{pL}$) when the transmission line is unloaded. Periodic loading by active loading elements of the transmission line 104 is achieved by making contact to the optical waveguide 105 using discrete elements 102 that are smaller in length than a total modulator length. The transmission line 104 includes an optical waveguide 105 and an electrical line 103 (which passes through coils 102). Discrete coils 102 with high inductance L are inserted to bring an effective impedance Z of the line 104 closer to a desired value. The number of discrete L-C segments 106 is small, e.g., just enough to keep the segment's physical dimensions well below a wavelength of an electrical signal traveling down the line 104, so that the line 104 still effectively acts as a continuous transmission line.

In a particularly useful embodiment, coils 102 are formed with multiple metal layers strapped together in an integrated circuit. The coils 102 can be made to have a very low series R (at high L), bringing the line 104 close to satisfying Heaviside conditions.

Figure 2:
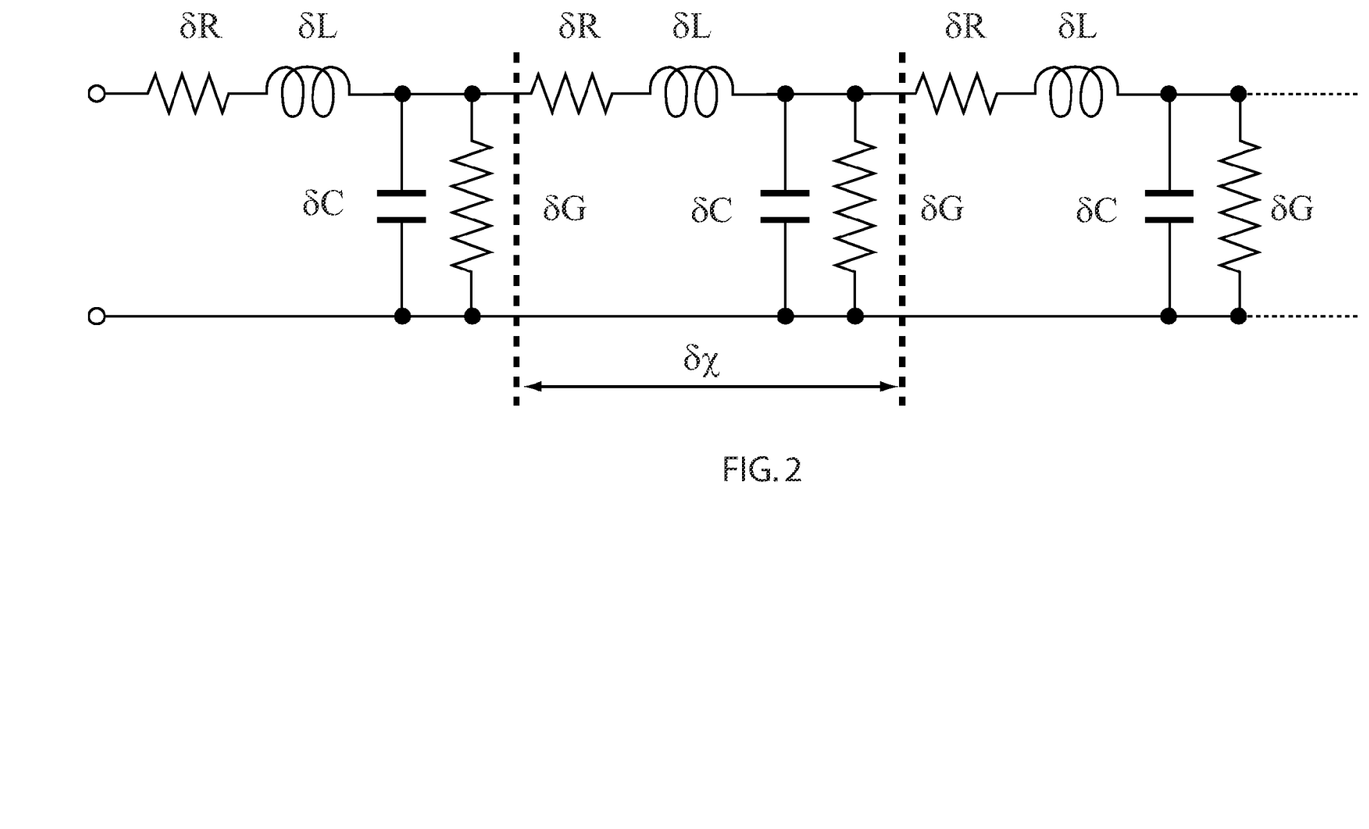
FIG. 2 is a schematic diagram demonstrating Heaviside conditions for a transmission line for one illustrative embodiment.

Referring to FIG. 2, Heaviside conditions for a lossy transmission line include the following. A Heaviside condition (for propagation with no distortion) includes:

$$\frac{R}{G} = \frac{L}{C}$$

where R is a resistance, G is transconductance, L in the inductance and C is the capacitance. Impedance of a lossy transmission line includes $$Z = \sqrt{\frac{R + j\omega L}{G + j\omega C}}.$$

When the Heaviside condition is met, Z is the same as that of the ideal line:

$$Z = \sqrt{\frac{L}{C}}.$$

Figure 3:
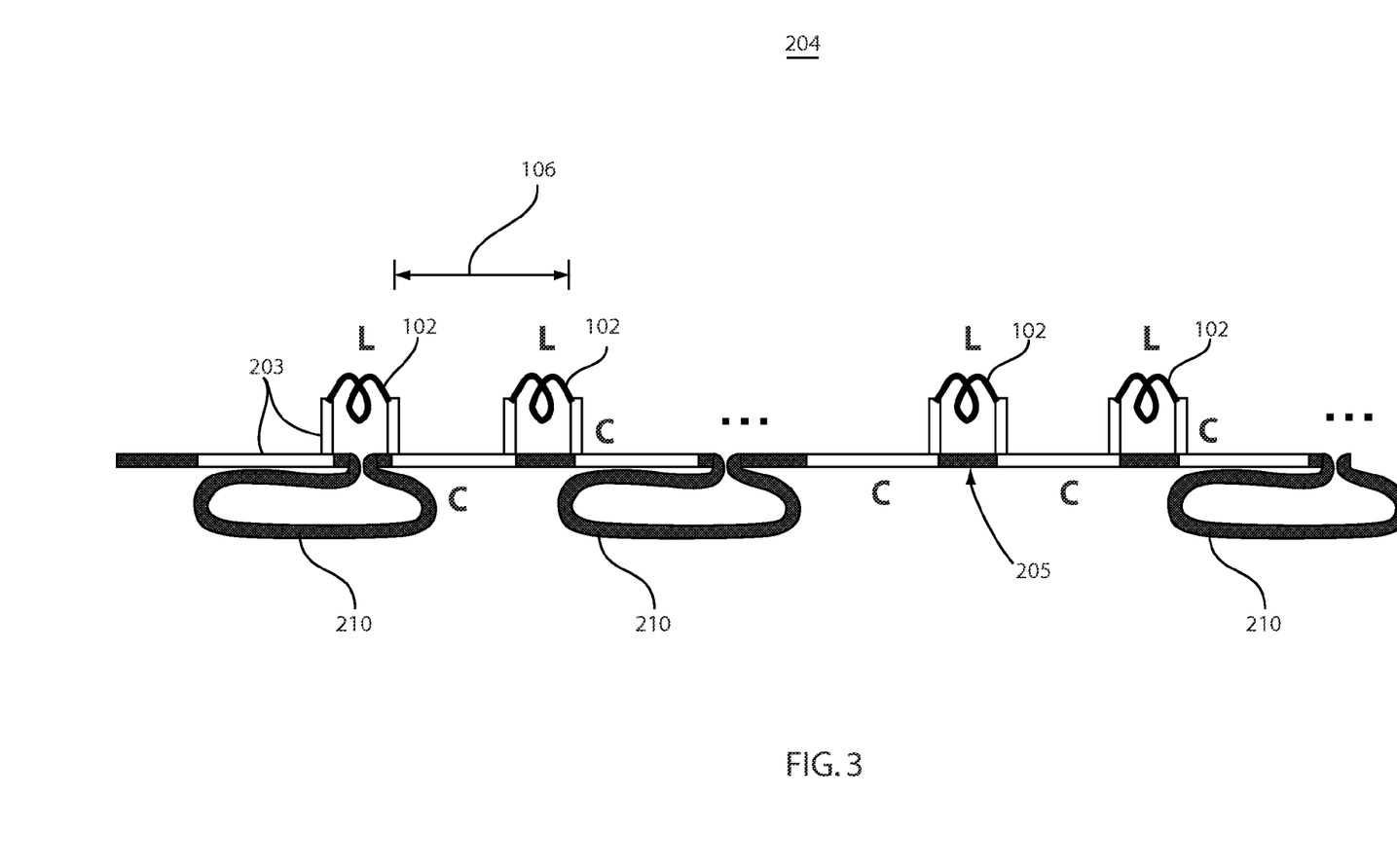
FIG. 3 is a diagram showing a transmission line having discrete inductors and additional waveguide segments for matched phase in accordance with another illustrative embodiment.

FIG. 3 shows parameters δR, δG, δL and δC for a differential segment δx of the transmission line.

Referring again to FIG. 1, gaps in the waveguide coverage can be kept to a minimum (e.g., limited by metal design rules only in an integrated circuit design). This increases modulator efficiency and reduces an overall size of the system. Electrodes 108 utilize discreet inductors 102 applied along electrical contacts 110 of an active optical modulator to form a distributed electrode structure 114 in one arm of a modulator. The combination of the inductors 102 and a capacitively active optical waveguide 105 forms a distributed LRC circuit. One of the advantages of this approach is that the inductors 102 can be optimized to control two of the three circuit parameters. These include inductance per unit length and resistance per unit length. The inductance can be designed and predicted using a variety of modeling tools (e.g., ASITIC™, HFSS™, AGILENT™ ADS™, etc.) and the resistance of the modulator electrodes can be minimized by utilizing multiple metal layers (available in a CMOS process) strapped together using vias between the levels. While the design of the inductors 102 in the distributed electrodes determines the L and the R of the distributed LRC circuit, the capacitance per unit length (C) is set by the physical dimensions of the active optical waveguide 105. The inductance coils 102 preferably include an inductance of between about 1 pH and 10 nH and preferably include a series resistance of less than 50 Ohms.

In practice, this means that a targeted value of loaded characteristic impedance can be achieved as illustrated by the equations set forth in background, but the microwave velocity will likely be substantially slower than the velocity of the optical signal. The characteristic impedance may be between about 20 and 150 Ohms, although other criteria may be employed. To simultaneously achieve a match between the optical and electrical signals, discrete low-loss optical delay elements 210 may be inserted between each of the active optical modulator segments, as shown in FIG. 3.

Figure 4:
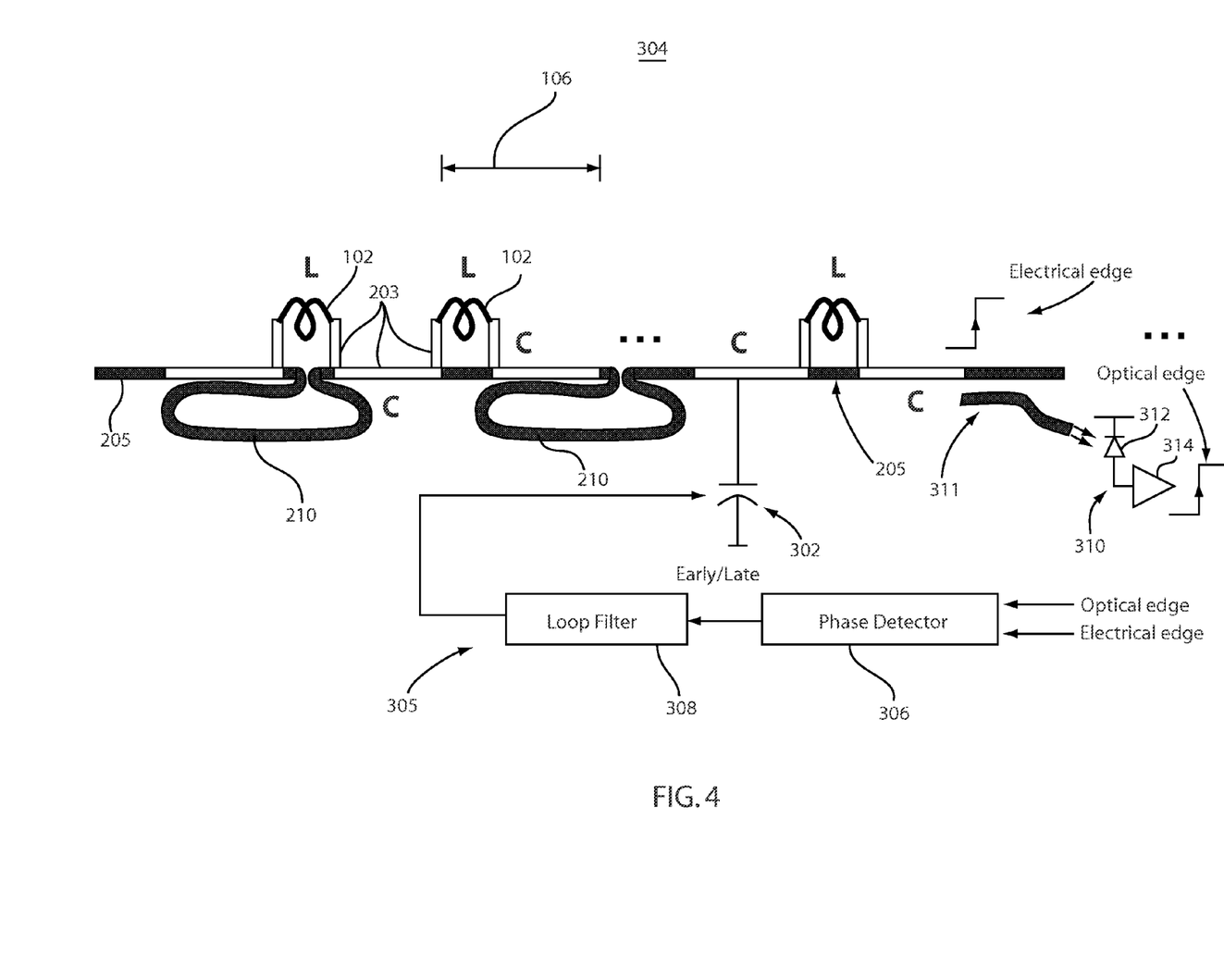
FIG. 4 is a diagram showing a transmission line having discrete inductors, additional waveguide segments, a delay locked loop and a varactor for matched phase in accordance with another illustrative embodiment.

A modulator configuration may include a splitter (not shown) that splits an optical input signal into branches. FIGS. 1, 3-4 show a single branch with a transmission line for a modulator. The modulator would include one or more of these branches, and all the branches may or may not include a transmission line. A splitter (not shown) may be employed to apply control in one or more arms to create a phase difference in the optical signal between the arms. The split signal may be merged again (e.g., using a coupler (not shown) at the end of the branches). So if the phase difference between the arms was 180 degrees the signals cancel when they are merged back together. If the phase difference is 0 or 360 degrees, the whole signal is provided again at the output. In this way, the modulator may function as a switch for on-off transmission of the optical signal. In one example, for a modulator with one or two inputs and two outputs, we can have the input(s) directed to either output, using the same technique. Other configuration may also be provided.

Referring to FIG. 3, a transmission line 204 (which may be an arm of an optical modulator) includes matched optical and electrical delays. Increasing inductance L in coils 102 also increases the delay per segment (or stage) 106 resulting in a mismatch between the speeds of the propagation of an electrical signal in an electrical path 203 and the light in an optical waveguide 205. For example, if L=100 pH, and C=100 fF, then delay per stage is 3 ps. If the size of a stage (106) is 100 microns, which is the distance the light travels in 1 ps, then a 2 ps of velocity mismatch exists per stage. For 10 or 20 stages, the mismatch becomes 20 to 40 ps, which is not acceptable for 20 Gb/s. Waveguide segments 210 (e.g., optical fiber) may be added to match the delays. The length of the segments 210 is selected to provide an appropriate delay.

Referring to FIG. 4, a transmission line 304 is illustratively depicted in accordance with another embodiment. Matching between the electrical and optical signals can be made adaptive by adding varactors 302 into the C-loads of the electrical line 203. In addition, a DLL (delay locked loop) 305 may be employed to adjust phase differences between the optical and electrical signals. The DLL 305 automatically matches optical and electrical delays. Matching of optical and electrical delays can vary as a function of process variability, changes in temperature, etc. Imperfect matching of delays limits the maximum achievable speed. Therefore, the varactors 302 added to the C-loading part of the electrical transmission line, tap off the optical signal coming out of a modulator arm (line 304) using a circuit 310 to convert the signal to the electrical domain (optical edge). A tap 311 collects a small portion of the optical energy (e.g., less than 10% is preferable and more preferably less than 5%). The circuit 310 includes a photodiode 312 or the like to convert the optical signal to an electrical signal. An amplifier 314 or other circuitry may also be employed. The DLL 305 compares electrical edge and optical edge arrival times using a phase detector 306. The phase detector output (early/late) is filtered by a loop filter 308, which filters that signal and controls the varactors 302 to ensure matching of both delays. It should be understood that a modulator may have multiple arms with at least one including a transmission line in accordance with the present principles.

In one embodiment, a high-bandwidth, low-distortion integrated electrical-photonic transmission line 304 is provided by breaking the line into stages 106 and inserting discrete (for example, spiral) multi-metal high-inductance, low-resistance inductor coils 102 between the stages 106 to meet the impedance requirements for broadband operation (e.g., 50 Ohms impedance or less, preferably less than about 10 Ohms, and more preferably between 1 to 5 Ohms, but a higher value may be appropriate for shorter lines with less segments).

A propagation speed (delay per stage) of optical and electrical waves is matched to achieve a highest possible data rate, e.g., 1 Gb/s or more, and preferably over 10 Gb/s. The present principles automatically adapt the speed of the electrical signal so that it matches the speed of the optical signal. This enables maximum operation speed during any conditions, e.g., processing, temperature, etc. While a DLL 305 is illustratively described, other tunable control circuits or delay mechanisms may also be employed.

If the transmission line 304 is employed in an optical modulator, the modulator may include a high-speed Mach-Zehnder modulator where at least one phase modulator electrode includes the transmission line 304. In another embodiment, a high-speed electro-absorption modulator employs the transmission line(s) 304 as a gain modulator electrode. The modulator may be included in an integrated circuit having a substrate formed from one or more of Si, GaAs, LiNbO$_3$, InP or any other semiconductor compound, single crystal or polymeric material.

Simulations were run to compare a structure in accordance with the present principles with conventional lumped (no additional inductor coils) at 20 Gb/s. The data eye (in an eye chart) is wide open when the proposed transmission line structure is used at 20 Gb/s, while the conventional approach was limited to operation at less than 5 Gb/s. Simulations using a practical implementation of the peaking coil in a 90 nm CMOS process were also performed. Special steps had to be taken to keep the series R of the coil low (several metal layers strapped together to minimize R). The simulation showed that 20 Gb/s operation is sensitive to the series R of the inductor coil.

Figure 5:
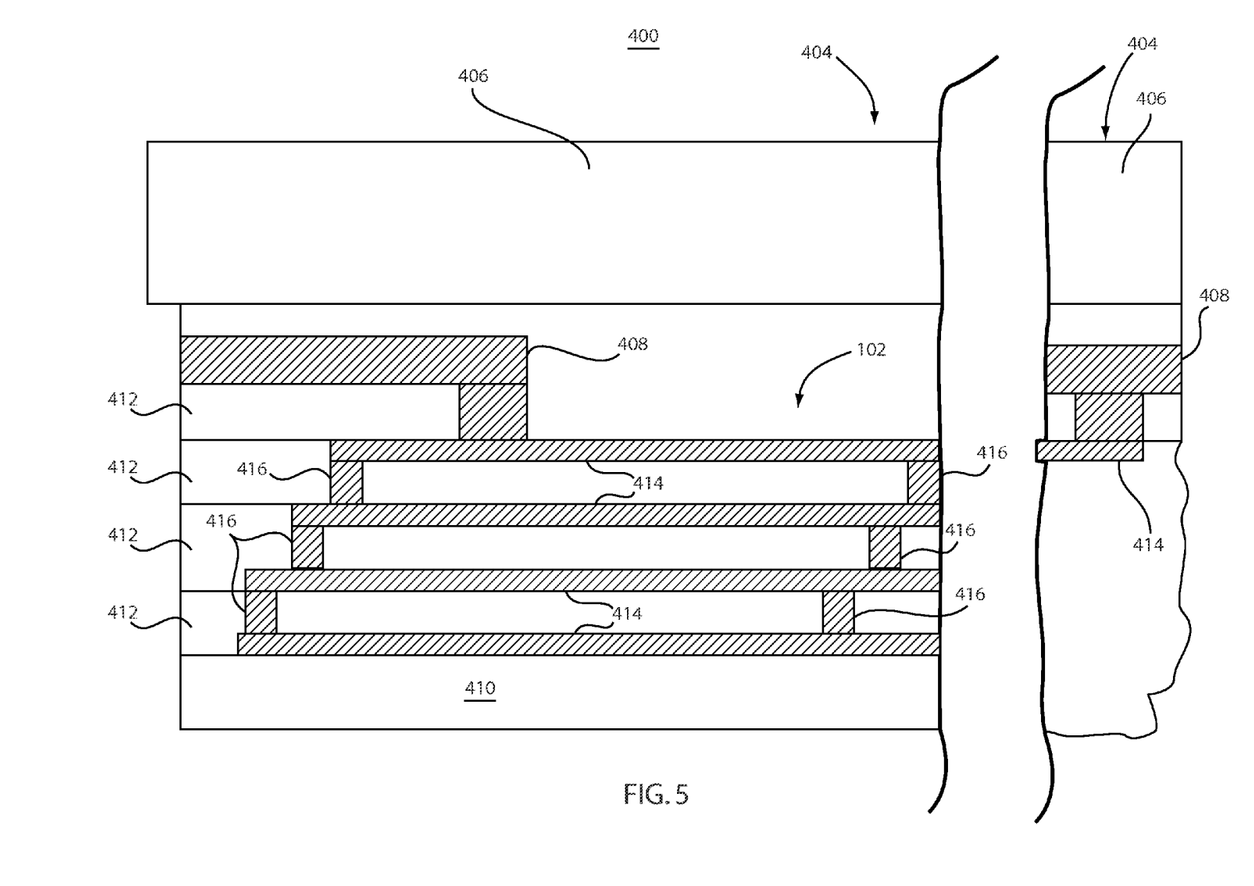
FIG. 5 is a cross-sectional view of a multi-layered integrated circuit for an inductor in accordance with another illustrative embodiment.

Referring to FIG. 5, an integrated circuit 400 includes a portion of a transmission line 404 in accordance with one illustrative embodiment. Integrated circuit 400 preferably includes a semiconductor integrated circuit chip although a printed wiring board or other configuration may be employed. Circuit 400 is illustratively depicted to demonstrate one exemplary configuration. It should be noted that other configurations including other devices and structures can also be employed. For example, a modulator, diodes, varactors, transistors (e.g., for use in an amplifier, DLL, etc.), may also be integrated into circuit 400 or connected to circuit 400. Circuit 400 may include a single chip including at least one transmission line 404 (see, e.g., lines 104, 204, and 304), which includes an optical waveguide 406 and an electrical path 408. The optical waveguide 406 may include an optical fiber or other waveguide.

Circuit 400 is shown in two portions with broken lines to show that the circuit continues. A single transmission line may be employed on a single chip, may span across multiple chips or may connect over larger distances using cables, fibers and/or leads. Circuit 400 includes a substrate 410, which may include, e.g., Si, InP, GaAs, LiNbO$_3$, a polymer or other elements or compounds. Substrate 410 has a plurality of layers 412 formed thereon. The layers 412 include conductive lines 414. The conductive lines 414 may be employed for various functions of the circuit 400; however, FIG. 5 shows a plurality of lines 414 and connections 416 to reduce series resistance in inductor coils 102. While an entire coil 102 is not depicted, an illustrative portion shows a number of conductive lines 414 combined to form the coils 102. Electrical path 408 connects to the coil 102 and runs through the transmission line 404. The optical path 406 also runs continuously along or through circuit 400. Additional waveguide segments 210 (FIG. 4) may be placed on the circuit 400, between chips, on a chip, etc.

Figure 6:
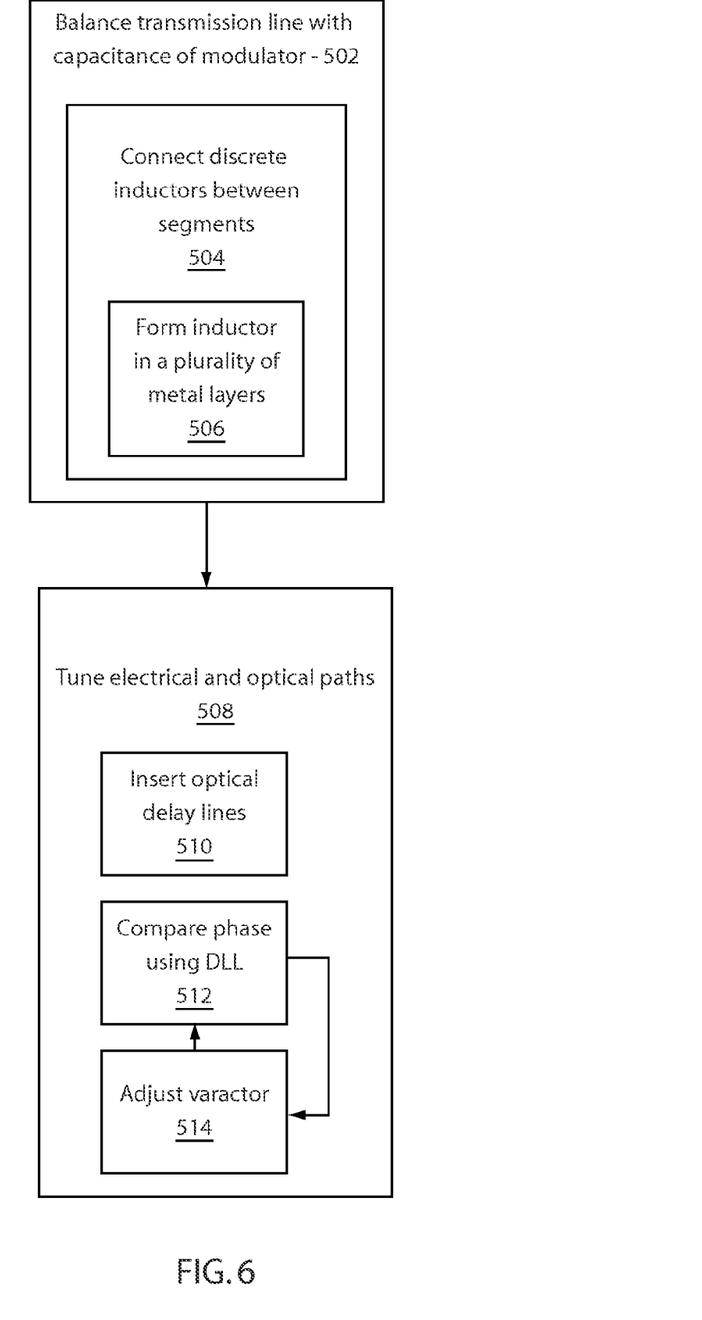
FIG. 6 is a block/flow diagram for operating a transmission line in accordance with an illustrative embodiment.

Referring to FIG. 6, a method for implementing a broadband transmission line is illustratively shown in accordance with one embodiment. In block 502, capacitance of an optical modulator is balanced with a broadband transmission line to achieve a characteristic impedance for the transmission line. In block 504, the balance may be achieved by connecting a discrete inductor, e.g., a spiral inductor, between adjacent modulator segments of the transmission line. In block 506, the inductor is formed in a plurality of metal layers of an integrated circuit to reduce series resistance and increase inductance.

In block 508, a control circuit is tuned to match velocity between an electrical signal and an optical signal traveling in respective paths in the continuous transmission line. In block 510, tuning may include inserting one or more optical delay lines in the optical path. In block 512, the tuning may include comparing phases of the electrical signal and of the optical signal using a delay locked loop (DLL). In block 514, tuning may include adjusting a varactor coupled to a segment capacitance. The varactor may be adjusted using the DLL output.

Having described preferred embodiments of a system and method for low distortion high bandwidth adaptive transmission line for integrated photonic applications (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A transmission line, comprising:
a plurality of segments forming an electrical path;
a continuous optical path passing through the segments; and
discrete inductors formed between and connecting adjacent segments, the inductors being formed in a plurality of metal layers of an integrated circuit to balance capacitance of an optical modulator which includes the transmission line to achieve a characteristic impedance for the transmission line.

2. The line as recited in claim 1, wherein the integrated circuit includes a substrate comprised of at least one of a semiconductor material and a polymeric material.

3. The line as recited in claim 1, wherein the plurality of segments includes a number of segments to keep physical dimensions below a wavelength of an electrical signal traveling down the transmission line.

4. The line as recited in claim 1, wherein the inductance coils include an inductance of between about 1 pH and 10 nH.

5. The line as recited in claim 1, wherein the inductance coils include a series resistance of less than 50 Ohms.

6. The line as recited in claim 1, wherein the line includes a bandwidth of at least 1 Gb/s.

7. The line as recited in claim 1, further comprising a delay mechanism configured to match phase between an electrical signal traveling on the electrical path and an optical signal traveling on the optical path.

8. The line as recited in claim 7, wherein the delay mechanism includes an optical delay line inserted in the optical path.

9. The line as recited in claim 7, wherein the delay mechanism includes a delay locked loop to compare phases of the electrical signal and the optical signal.

10. The line as recited in claim 9, further comprising a varactor coupled to a segment capacitance wherein the varactor is controlled by the delay locked loop.

11. A transmission line, comprising:
a plurality of segments having a continuous electrical path and a continuous optical path through the segments;
discrete inductors formed between and connecting adjacent segments, the inductors being formed in a plurality of metal layers of an integrated circuit to balance capacitance of an optical modulator which includes the transmission line to achieve a characteristic impedance for the transmission line; and
a delay mechanism configured to match phase between an electrical signal traveling on the electrical path and an optical signal traveling on the optical path to enable an operating bandwidth.

12. The line as recited in claim 11, wherein the integrated circuit includes a substrate comprised of at least one of a semiconductor and a polymeric material.

13. The line as recited in claim 11, wherein the plurality of segments includes a number to keep segment physical dimensions below a wavelength of an electrical signal traveling down the line.

14. The line as recited in claim 11, wherein the inductance coils include an inductance of between about 1 pH and 10 nH and a series resistance of less than 50 Ohms.

15. The line as recited in claim 11, wherein the operating bandwidth includes a bandwidth of at least 1 Gb/s.

16. The line as recited in claim 11, wherein the delay mechanism includes an optical delay line inserted in the optical path.

17. The line as recited in claim 11, wherein the delay mechanism includes a delay locked loop to compare phases of the electrical signal and the optical signal.

18. The line as recited in claim 17, further comprising a varactor coupled to a segment capacitance wherein the varactor is controlled by the delay locked loop.

* * * * *